United States Patent
Marsh et al.

(10) Patent No.: US 11,169,368 B2
(45) Date of Patent: Nov. 9, 2021

(54) METHOD AND SYSTEM FOR LOCALISATION MICROSCOPY

(71) Applicant: King's College London, London (GB)

(72) Inventors: Richard Marsh, London (GB); Susan Cox, London (GB)

(73) Assignee: King's College London, London (GB)

( * ) Notice: Subject to any disclaimer, the term of this patent is extended or adjusted under 35 U.S.C. 154(b) by 0 days.

(21) Appl. No.: 16/959,346

(22) PCT Filed: Dec. 21, 2018

(86) PCT No.: PCT/GB2018/053765
§ 371 (c)(1),
(2) Date: Jun. 30, 2020

(87) PCT Pub. No.: WO2019/135069
PCT Pub. Date: Jul. 11, 2019

(65) Prior Publication Data
US 2020/0348504 A1    Nov. 5, 2020

(30) Foreign Application Priority Data

Jan. 2, 2018  (GB) ..................................... 1800026
Mar. 7, 2018  (GB) ..................................... 1803638

(51) Int. Cl.
*G01N 21/64* (2006.01)
*G02B 21/36* (2006.01)
(Continued)

(52) U.S. Cl.
CPC ....... *G02B 21/367* (2013.01); *G01N 21/6408* (2013.01); *G01N 21/6458* (2013.01); *G02B 21/16* (2013.01); *G02B 27/58* (2013.01)

(58) Field of Classification Search
CPC ...... G02B 21/367; G02B 21/16; G02B 27/58; G01N 21/6408; G01N 21/6458
See application file for complete search history.

(56) References Cited

U.S. PATENT DOCUMENTS 7,803,634 B2 * 9/2010 Klimov .............. G01N 21/6486
                                                          436/172
7,916,304 B2 * 3/2011 Hess .................. G01N 21/6458
                                                          356/496
(Continued)

FOREIGN PATENT DOCUMENTS

DE    102015016353 A1    6/2017
WO      2006127592 A2   11/2006

OTHER PUBLICATIONS

Rust, M., Bates, M., and Zhuang, X. Sub-diffraction-limit imaging by stochastic optical re-construction microscopy (STORM). Nat. Methods 3, 793-796 (2006).
(Continued)

*Primary Examiner* — David P Porta
*Assistant Examiner* — Djura Malevic
(74) *Attorney, Agent, or Firm* — Banner & Witcoff, Ltd.

(57) ABSTRACT

Embodiments of the present invention provide a method and system for processing microscopy images to enable localisation analysis of high density raw data, and thereby achieve higher spatial resolution than would otherwise be the case. This is achieved by exploiting temporal redundancies in the image data resulting from close-to emitters that would otherwise be resolved as a single emitter were they to emit or fluoresce at the same time, but which, by virtue of emitting or fluorescing at slightly different (yet potentially overlapping) times, can be subject to temporal filtering by different filters of different temporal bandwidth to resolve the two emitters. Effectively, the different temporal filters have different time constants which work together to effectively highlight the different emission or fluorescence times of the two emitters, to thereby allow the two close-to emitters to be separately resolved.

20 Claims, 5 Drawing Sheets

(51) Int. Cl.
*G02B 21/16* (2006.01)
*G02B 27/58* (2006.01)

(56) References Cited

U.S. PATENT DOCUMENTS

| | | | | |
|---|---|---|---|---|
| 7,977,625 | B2* | 7/2011 | Schwertner | G06T 7/55 |
| | | | | 250/252.1 |
| 8,564,792 | B2* | 10/2013 | Zhuang | G02B 21/16 |
| | | | | 356/624 |
| 9,104,903 | B2* | 8/2015 | Callahan | H01J 37/228 |
| 9,137,516 | B2* | 9/2015 | Zhuang | G02B 21/16 |
| 9,339,194 | B2* | 5/2016 | Adams | A61B 5/14551 |
| 9,523,846 | B2* | 12/2016 | Soeller | G02B 21/0004 |
| 9,712,805 | B2* | 7/2017 | Zhuang | H04N 7/18 |
| 9,739,993 | B2* | 8/2017 | Sirat | G01N 21/6458 |
| 9,910,255 | B2* | 3/2018 | Berner | G02F 1/0311 |
| 10,066,934 | B2* | 9/2018 | Tsuyuki | G01B 11/2441 |
| 10,073,035 | B2* | 9/2018 | Zhuang | G01N 21/6428 |
| 10,247,931 | B2* | 4/2019 | Sirat | G01N 21/6458 |
| 10,302,569 | B2* | 5/2019 | Matsumoto | G02B 21/26 |
| 10,412,366 | B2* | 9/2019 | Zhuang | G02B 21/16 |
| 10,725,279 | B2* | 7/2020 | Hua | H04N 5/2256 |
| 10,794,828 | B2* | 10/2020 | Zhuang | G01N 33/582 |
| 10,921,255 | B2* | 2/2021 | Sirat | G01N 21/6456 |
| 2003/0139886 | A1 | 7/2003 | Bodzin | G01N 21/47 |
| | | | | 702/28 |
| 2007/0023686 | A1* | 2/2007 | Wolleschensky | G02B 21/0076 |
| | | | | 250/458.1 |
| 2008/0032414 | A1* | 2/2008 | Zhuang | G01N 21/6428 |
| | | | | 436/172 |
| 2008/0182336 | A1* | 7/2008 | Zhuang | G01N 15/1429 |
| | | | | 436/172 |
| 2009/0206251 | A1 | 8/2009 | Hess et al. | |
| 2011/0002530 | A1* | 1/2011 | Zhuang | H04N 7/18 |
| | | | | 382/154 |
| 2011/0293154 | A1* | 12/2011 | Meixner | G01N 21/6408 |
| | | | | 382/128 |
| 2011/0297847 | A1* | 12/2011 | Courtney | G02B 21/0076 |
| | | | | 250/459.1 |
| 2012/0206798 | A1* | 8/2012 | Knop | G02B 21/002 |
| | | | | 359/385 |
| 2013/0096392 | A1* | 4/2013 | Adams | A61B 5/0064 |
| | | | | 600/301 |
| 2013/0126759 | A1* | 5/2013 | Betzig | G02B 21/367 |
| | | | | 250/459.1 |
| 2013/0300833 | A1* | 11/2013 | Soeller | G06K 9/4671 |
| | | | | 348/46 |
| 2014/0038201 | A1* | 2/2014 | Zhuang | G01N 21/6458 |
| | | | | 435/7.1 |
| 2014/0038289 | A1* | 2/2014 | Nieh | C12N 5/0693 |
| | | | | 435/397 |
| 2014/0063194 | A1* | 3/2014 | Zhuang | G02B 21/367 |
| | | | | 348/46 |
| 2014/0126801 | A1* | 5/2014 | Callahan | G06K 9/0014 |
| | | | | 382/133 |
| 2015/0029325 | A1* | 1/2015 | Dholakia | G02B 27/0927 |
| | | | | 348/79 |
| 2015/0212308 | A1* | 7/2015 | Sirat | G02B 21/16 |
| | | | | 250/459.1 |
| 2016/0083783 | A1* | 3/2016 | Blainey | G01N 21/78 |
| | | | | 435/5 |
| 2016/0195705 | A1* | 7/2016 | Betzig | G02B 5/005 |
| | | | | 348/79 |
| 2016/0202185 | A1* | 7/2016 | Zhuang | G02B 27/58 |
| | | | | 250/459.1 |
| 2016/0370290 | A1 | 12/2016 | Raphael et al. | |
| 2017/0038574 | A1* | 2/2017 | Zhuang | G02B 21/0076 |
| 2017/0322406 | A1* | 11/2017 | Sirat | G02B 21/0076 |
| 2017/0336326 | A1* | 11/2017 | Sirat | G01N 21/636 |
| 2018/0113074 | A1* | 4/2018 | Gigler | G01J 3/0229 |
| 2018/0232883 | A1* | 8/2018 | Sethi | G06K 9/628 |
| 2018/0356343 | A1* | 12/2018 | Neuman | G01N 21/6428 |
| 2019/0219811 | A1* | 7/2019 | Keller | G02B 21/06 |
| 2019/0284552 | A1* | 9/2019 | Collins | C12Q 1/6837 |
| 2019/0324254 | A1* | 10/2019 | Sirat | G02B 21/0072 |
| 2019/0331907 | A1* | 10/2019 | Franke | G02B 21/008 |
| 2020/0012121 | A1* | 1/2020 | Wang | G02B 21/33 |
| 2020/0292455 | A1* | 9/2020 | Chang | G02B 21/0076 |
| 2020/0294763 | A1* | 9/2020 | Chang | G02B 21/0076 |

OTHER PUBLICATIONS

Betzig, E. et al. Imaging intracellular fluorescent proteins at nanometer resolution. Science 313, 1642-1645 (2006).
Fox-Roberts, P. et al. Local dimensionality determines imaging speed in localization microscopy. Nature Communications 8,13558 (2017).
Nieuwenhuizen, R. P. J. et al. Image resolution in optical nanoscopy. Nature Methods 10, 557-562 (2013).
Huang, F., Schwartz, S., Byars, J., and Lidke, K. Simultaneous multiple-emitter fitting for single molecule superresolution imaging. Biomedical Optics Express 2, 1377-1393 (2011).
Zhu, L., Zhang, W., Elnatan, D., and Huang, B. Faster STORM using compressed sensing. Nature Methods 9, 721-723 (2012).
Dertinger, T., Colyera, R., Iyera, G., Weissa, S., and Enderlein, J. Fast, background-free, 3D Super-resolution optical fluctuation imaging (SOFI). Proc. Natl. Acad. Sci. 106, 22287-22292 (2009).
Cox, S. et al. Bayesian localization microscopy reveals nanoscale podosome dynamics. Nature Methods 9, 195-200 (2012).
Gustafsson, N. et al. Fast live-cell conventional fluorophore nanoscopy with ImageJ through super-resolution radial fluctuations. Nature Communications 7, 12471 (2016).
Burnette, D. T., Sengupta, P., Dai, Y., Lippincott-Schwartz, J., and Kachar, B. Bleaching/blinking assisted localization microscopy for superresolution imaging using standard fluorescent molecules. PNAS 108, 21081-21086 (2011).
Ovensy, M., Ki'fzek, P., Borkovec, J., Svindrych, Z. and Hagen, G. M. ThunderSTORM: a comprehensive ImageJ plug-in for PALM and STORM data analysis and super-resolution imaging. Bioinformatics 30, 2389-2390 (2014).
Mar. 26, 2019—PCT/GB2018/053765—ISR & WO.
Hoogendoorn, E. et al. The fidelity of stochastic single-molecule super-resolution reconstructions critically depends upon robust background estimation. Scientific Reports 4:1, 1-10 (2014).
Kervrann, C. et al. A guided tour of selected image processing and analysis methods for fluorescence and electron microscopy. IEEE Journal of Selected Topics in Signal Processing, 10:1, 6-30 (2016).
Jul. 2, 2018—Search Report—GB 1800026.5.
Yaron, T. et al. Temporal superresolution based on a localization microscopy algorithm. Applied Optics, 56: 9 (2017).
Burgert, A., Letschert, S., Doose, S., and Sauer, M. Artifacts in single-molecule localization microscopy. Histochemistry and Cell Biology 144, 123-131 (2015).
Holden, S.J., Uphoff, S. and Kapanidis, A.N. DAOSTORM: an algorithm for high-density super-resolution microscopy. Nature Methods 8 279-280 (2011).
Heilemann, M., Van de Linde, S., Schuttpelz, M., Kasper, R., Seefeldt, B., Mukherjee, A., Tinnefeld, P., and Sauer, M. Subdiffraction-Resolution Fluorescence Imaging with Conventional Fluorescent Probes. Angew Chem Int Ed Engl. 47(33):6172-6 (2008).

* cited by examiner

METHOD AND SYSTEM FOR LOCALISATION MICROSCOPY

TECHNICAL FIELD

Embodiments of the present invention relate to a method and system for processing localisation microscopy image sequences to reduce the density of observed emitters/flurophores in individual image frames by the sequential application of multiple time-scale sliding temporal filters. The reduced density allows low as well as high density data analysis methods to be subsequently applied to the data without generating the image artefacts typically produced when applying these methods to data with a high density of emitters.

BACKGROUND TO THE INVENTION AND PRIOR ART

Localisation microscopy is a technique in light microscopy for obtaining image resolution beyond the diffraction limit, commonly referred to as super-resolution. It involves chemically labelling the sample structure with fluorescent molecules that display fluorescence intermittency or 'blinking'. The fluorescence intermittency can be controlled by the addition of chemicals and by illumination with light of the appropriate intensity and wavelength. The means of fluorescently labelling the sample structure and controlling the fluorescence emission intermittency broadly fall into two types. Stochastic Optical Reconstruction Microscopy (STORM) labels the sample with fluorescent organic dye molecules. The fluorescence intermittency is usually aided by the addition of oxygen scavenging enzymes and a chemical reducing agent. Photo Activatable Localisation Microscopy (PALM) uses fluorescent proteins to label the structure which can be switched from a non-emitting state into an emitting state or from one emitting state to another of longer wavelength by the application of short wavelength visible/near UV light (UV light can also reactivate emitters/flurophores in STORM).

When an image of the sample is captured in a typical localisation microscopy instrument it will consist of a number of fluorescence 'spots' of near diffraction limited size. The size of these spots defines the instrument point spread function (PSF). Each spot has been produced by a single emitter/flurophore that has either spontaneously or deliberately been switched into the appropriate emitting state. If the fluorescence spots are sufficiently separated that they do not overlap one another it can be safely assumed that there is only a single active emitter/flurophore contributing to that spot. The position of the emitter can then be determined from its fluorescence emission to a much greater precision than the size of the fluorescence spot (a precision of typically 10-30 nm). This is the process known as localisation, and is invariably performed by an algorithm implemented in computer software. If a sufficient number of emitters/fluorophores are successfully localised the sample structure can be inferred from these localised positions to high resolution. The images of the emitter/flurophore emission are typically captured using a high sensitivity (sCMOS/EMCCD) camera attached to a conventional wide-field fluorescence microscope as a long sequence of sequential image frames. In each subsequent frame some of the active emitters/fluorophores will have switched out of the emitting state and some other previously non emitting ones switched into emission. The requirement for active emitters/flurophores to be well separated limits the number of active emitters/flurophores in each frame to a relatively low number, typically requiring tens of thousands of image frames to accurately reconstruct the sample structure. The limitations of the speed of the cameras used means image acquisition takes several minutes, which is too long to capture many dynamic changes to the structure under study, such as those normally present in live cell samples.

Example published prior art that is represented by the above summary includes (ref STORM.) Rust, M., Bates, M., and Zhuang, X. Sub-diffraction-limit imaging by stochastic optical re-construction microscopy (STORM). Nat. Methods 3, 793-796 (2006); (ref PALM) Betzig, E. et al. Imaging intracellular fluorescent proteins at nanometer resolution. Science 313, 1642-1645 (2006); and (ref PALM patent) WO/2006/127592 Optical microscopy with phototransformable optical labels. Hess, Harold F.

The speed of acquisition can be greatly increased by increasing the number of active emitters/flurophores in each image frame, reducing the necessary number of frames for an accurate reconstruction. However the localisation method/algorithm must be able to cope with the substantial overlap of individual emitter's fluorescence emission patterns (spots). The experimental regime where the typical distance between active emitters becomes less than than the PSF is referred to as high density localisation microscopy. When this regime is reached standard single emitter algorithms, such as single Gaussian fitting, will fail to detect and/or accurately localise each emitter. In addition the fitted positions of closely separated emitters/flurophores contain a bias towards the mutual centre. This leads to substantial artefacts in the reconstructed super-resolution image, such as artificial sharpening, false clustering and missing structure. Artificial sharpening is particularly problematic as it gives a false impression of high resolution, even when measured by metrics such as Fourier ring correlation (FRC). There is currently no method to detect the presence of these artefacts in a localisation microscopy reconstruction. As there is seldom knowledge of the ground truth structure of the sample under examination, these artefacts can easily be mistaken for genuine structure.

Further prior art representative of the above includes (ref artefacts) Burgert, A., Letschert, S., Doose, S., and Sauer, M. Artifacts in single-molecule localization microscopy. Histochemistry and Cell Biology 144, 123-131 (2015); (ref artefacts) Fox-Roberts, P. et al. Local dimensionality determines imaging speed in localization microscopy. Nature Communications 8, 13558 (2017); and (ref FRC) Nieuwenhuizen, R. P. J. et al. Measuring image resolution in optical nanoscopy. Nature Methods 10, 557-562 (2013).

A number of approaches have been developed to address the situation of overlapping emitter PSFs but they all still produce image artefacts when the emitter density is sufficiently high. These are briefly summarised below.

i) Multi Emitter Fitting:

This method is an extension of the standard single emitter—single frame fitting methods used in low emitter density data. Here local maxima in the image of the scale of the PSF are identified and a small section of image around the maxima is selected (as with single emitter fitting). A model PSF is fitted to this section for one or more emitters. Usually the number of contributing emitters is increased until no statistically significant improvement in the fit is observed. A regularisation term is usually introduced to limit the number of fluorophores fitted and/or constraints placed on their intensities. This method works well when the separation between emitters is not too small (ca 250 nm) and the density is still low enough for well defined local maxima to be observed and the number of overlapping flurophores is fairly low. It tends to fail badly however when any of these conditions are not met. Example prior art for multi-emitter fitting includes (Ref ME fitting) Huang, F., Schwartz, S., Byars, J., and Lidke, K. Simultaneous multiple-emitter fitting for single molecule super-resolution imaging. Biomedical Optics Express 2, 1377-1393 (2011); and (Ref ME fitting) Holden, S. J., Uphoff, S. and Kapanidis, A. N. DAOSTORM: an algorithm for high-density super-resolution microscopy. Nature Methods 8 279-280 (2011)

ii) Compressed Sensing:

Compressed sensing is a well established method of signal processing covering an extensive variety of fields and applications. It is an optimisation technique that under certain conditions can recover a substantially under sampled signal provided it is sufficiently sparse (contains mostly zeros). In the context of super-resolution microscopy this means a higher resolution transformation of each image frame with many more much smaller pixels. All these transformed frames are then summed to produce the final super-resolution image. To perform the optimisation certain conditions must be met. The sample structure must be sparse, i.e. most of the sample must contain no labelled structure. While this may be globally true for some biological structures such as micro-tubules, it may not always be true locally. The instrument PSF must be precisely known and constant everywhere. This is unlikely to be true as there is almost always some degree of focus drift or aberrations for example. The variation in the background must also be small over the size of the analysed image.

Whilst this method significantly outperforms single emitter fitting in terms of identifying individual emitters at high emitter density, the accuracy falls significantly once the typical separation of flurophores is less than the PSF full width half maximum. A number of mathematical methods are used in compressed sensing to perform the optimisation, which are known to produce artefacts under certain conditions. How these apply to super-resolution microscopy is not yet known.

Example prior art for compressed sensing microscopy includes (ref compressed sensing microscopy) Zhu, L., Zhang, W., Elnatan, D., and Huang, B. Faster STORM using compressed sensing. Nature Methods 9, 721-723 (2012).

iii) SOFI: Super-Resolution Optical Fluctuation Imaging.

In this method the intensity fluctuation over the entire image sequence is analysed. The auto- or cross-cumulant of the pixel intensity time traces is calculated to a specified order. Where fluctuations are clustered there is a higher density of flurophores, so this method does not associate individual fluctuations to individual flurophores. A map of the calculated values forms the super-resolution image. A known artefact of this method is that it tends to exaggerate the brightness of areas of the sample with higher than average relative intensity, which is affected by the 'blinking' properties of each flurophore. This can lead to less bright structures being undetectable in the super-resolution image. To obtain resolution significantly higher than the diffraction limit the cumulants have to calculated to high order, which greatly exacerbates this problem.

Example prior art for SOFI includes (Ref SOFI) Dertinger, T., Colyera, R., Iyera, G., Weissa, S., and Enderlein, J. Fast, background-free, 3D Super-resolution optical fluctuation imaging (SOFI). Proc. Natl. Acad. Sci. 106, 22287-22292 (2009).

iv) 3B: Bayesian Blinking and Bleaching.

The approach adopted here is to attempt to find a model structure for the sample that will fit the entire image sequence accounting for the photo-switching ('blinking') and photo-bleaching behaviour of the flurophores. Starting from an initial guess, the flurophore positions are iteratively adjusted until no further improvements are observed. This method can obtain high resolution from a fairly small number of frames, but it suffers the same sharpening artefact as multi emitter fitting when the separation between emitters is small. It is also computationally very intensive, taking far longer to calculate than any other method. This limits its application to quite small image sizes unless large scale computing resources are available.

Example prior art includes (Ref 3B) Cox, S. et al. Bayesian localization microscopy reveals nanoscale podosome dynamics. Nature Methods 9, 195-200 (2012).

v) SRRF: Super-Resolution Radial Fluctuations.

SRRF may be considered a hybrid system, combining localisation of emitters with higher order temporal correlations (such as in SOFI). In the first part a sub pixel map of the local radial symmetry in the image is produced from the spatial gradients of the pixel intensities. Where an emitter is located there should be a high degree of local radial symmetry. One of these 'radiality maps' is produced for each frame in the sequence. The entire sequence of 'radiality maps' is then analysed in a similar way to SOFI, but this time calculating the temporal correlations in the time traces of each 'radiality map' sub pixel. These values then produce the final super-resolution image. This method combines both the advantages and disadvantages of localisation and temporal analysis. Both stages can produce useful resolution gains, but it suffers the same artificial sharpening artefact as other fitting methods for closely spaced flurophores and also the exaggerated contrast of brighter and dimmer parts/missing parts of the structure seen with SOFI Example prior art for SRRF includes Ref SRRF) Gustafsson, N. et al. Fast live-cell conventional fluorophore nanoscopy with ImageJ through super-resolution radial fluctuations. Nature Communications 7, 12471 (2016).

vi) BALM: Bleaching/Blinking Assisted Localisation Microscopy.

Rather than examining the entire image sequence for gaining temporal information useful in increasing resolution, this method only compares two frames at a time by subtracting one from the other (adjacent pairs). This method is intended for flurophore labels that do not show pronounced intensity switching behaviour or without the use of a photo-switching buffer. To begin with the vast majority of flurophores are in the emitting state. As time passes they either switch 'off' or photo-bleach. Flurophores that switch 'off' or photobleach in a particular image frame can be detected by subtracting the subsequent frame from the current one. The localisation algorythm is then applied to this 'difference' frame. Rarer 'switch 'on' events can be isolated by subtracting the previous frame.

This method has a number of disadvantages however compared to conventional localisation microscopy and the other high density methods above. Most significantly it is arguably not a high density technique. The emitter density in each difference frame is still restricted by the localisation algorithm's ability to resolve closely spaced emitters, thus requiring a similar number of frames to produce a high fidelity super resolution reconstruction. It does not separate overlapping emitters that turned 'off' (or 'on') in the same frame. Similarly if a nearby emitter switches 'on' in the same frame as one switches 'off' they will partially obscure each other in the 'difference' frame, leading to inaccurate localisation. If the flurophores are only switching/bleaching slowly the vast majority of their emitted photons will be neglected from the difference frame leading to a much less accurate (if unbiased) localisation. As most of the flurophores are emitting the individual pixel intensity values are very high. The photon shot and camera readout noise will also be high compared to the difference signal. There will therefore be a much lower signal to noise ratio than in conventional localisation microscopy, leading to less accurate localisation and resultant lower resolution.

Example prior art for BALM includes (Ref BALM) Burnette, D. T., Sengupta, P., Dai, Y., Lippincott-Schwartz, J., and Kachar, B. Bleaching/blinking assisted localization microscopy for superresolution imaging using standard fluorescent molecules. PNAS 108, 21081-21086 (2011).

vii) Multi Colour Detection

All the above methods can be used in combination with multi colour detection. In this variation of Localisation Microscopy two or more different structures within the sample are labelled with fluorescent molecules of differing emission wavelengths (colours). The apparatus involved is the same as for conventional localisation microscopy but with the addition of optical filters into the optical path of the collected fluorescence emission. The pass-bands of the optical filters are chosen to separate the emission wavelengths of the two fluorescent marker molecules. The filtered fluorescence is then image either on separate cameras of on separate regions of the sensor of a single camera. Thus multiple image sequences can be produced corresponding to each fluorescent marker, allowing simultaneous imaging of multiple structures within the sample. However it can be difficult to engineer appropriate 'blinking' of multiple fluorescent markers and the technique can be effected by chromatic aberrations. Example prior art of multicolour localisation microscopy includes (Ref Multicolour) Heilemann, M., Van de Linde, S., Schuttpelz, M., Kasper, R., Seefeldt, B., Mukherjee, A., Tinnefeld, P., and Sauer, M. Subdiffraction-Resolution Fluorescence Imaging with Conventional Fluorescent Probes. Angew Chem Int Ed Engl. 47(33): 6172-6 (2008).

SUMMARY OF THE INVENTION

Embodiments of the present invention provide a method and system for processing microscopy images to enable high density localisation, and thereby achieve higher spatial resolution than would otherwise be the case. This is achieved by exploiting temporal redundancies in the image data resulting from close-to emitters that would otherwise be resolved as a single emitter were they to emit or fluoresce at the same time, but which, by virtue of emitting or fluorescing at slightly different (yet potentially overlapping) times, can be subject to temporal filtering by different filters of different temporal bandwidth to resolve the two emitters. Effectively, the different temporal filters have different time constants which work together to effectively highlight the different emission or fluorescence times of the two emitters, to thereby allow the two close-to emitters to be separately resolved.

In view of the above, from one aspect there is provided a method for localisation microscopy, comprising: receiving a temporal sequence of microscopy image frames captured by a microscope, the image frames being images containing emitter or fluorophores therein; temporally filtering respective sets of pixel values for respective same pixel positions in the sequence of frames using at least one temporal filter in order to obtain at least one set of temporally filtered pixel values for the respective same pixel positions in the frames; and providing the at least one set of temporally filtered pixel values as input to a localisation algorithm to permit emitter or fluorophore localisation in dependence thereon.

In one embodiment, the temporal filtering comprises using at least two different temporal filters having different temporal characteristics in order to obtain at least two sets of temporally filtered pixel values for the same respective pixel positions in the frames, the at least two sets of temporally filtered pixel values being provided to the localisation algorithm to permit emitter or fluorophore location thereon.

Further features and aspects will be apparent from the appended claims.

DESCRIPTION OF THE FIGURES

Further features and advantages of the present invention will become apparent from the following description of an embodiment thereof, presented by way of example only, and with reference to the accompanying drawings, wherein like reference numerals refer to like parts, and wherein.

OVERVIEW OF EMBODIMENTS

Figure 1:
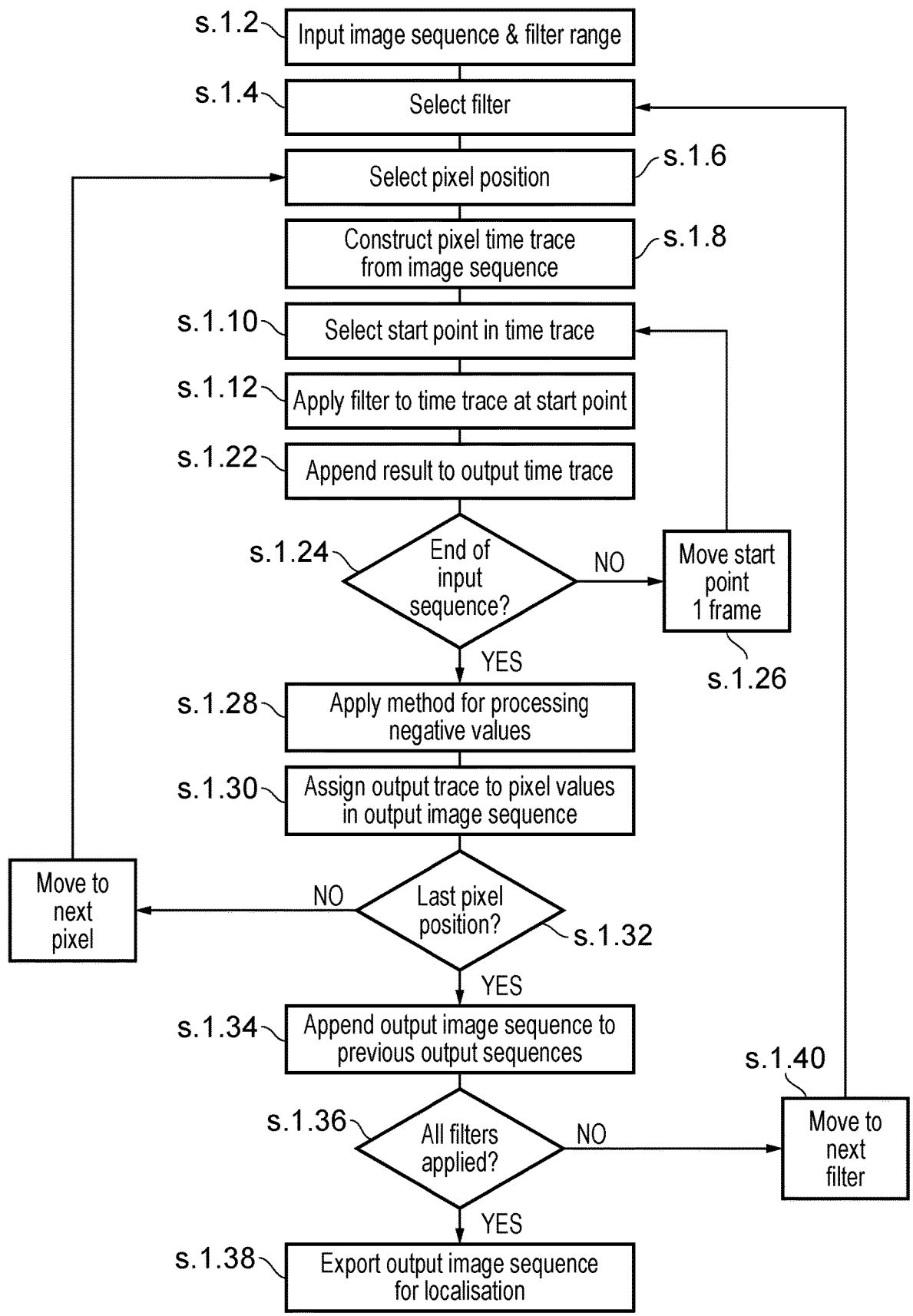
FIG. 1 is a flow diagram of a typical embodiment of the algorithm.

Embodiments of the invention comprise a method and system for processing a sequence of images, acquired using a localisation microscopy technique to reduce the number of active emitters/flurophores in each image. The technique is applied to the image sequence prior to any localisation method/algorithm, and the output of the invented technique is a much longer image sequence with fewer active emitters/flurophores in each image frame. The chosen localisation method/algorithm is then applied to the output image sequence to localise the individual emitter/flurophore positions and produce the super-resolution image. An alternative embodiment of the invention would be to combine the method of multiple temporal filtering with the localisation method/algorithm into a single method/algorithm. The filtering separates overlapping emitter/flurophore emission based on the number of adjacent frames for which they appear in the emitting state. Or more precisely, the number of adjacent image frames that maintained a fairly constant intensity before switching to a brighter or dimmer emitting state, or a non-emitting state.

The set of filters are any set that constitute a varying time-scale comparison of the pixel values of adjacent/nearby frames. Each filter will have a characteristic time-scale which describes the time (in terms of number of frames) between the first and last image frame it compares. Each filter will then isolate emitter intensity fluctuations/switching events on that characteristic time scale from all other events. The range of time-scales used will reflect the range of emitter fluctuation/switching time-scales so as to capture the majority of these events. The upper limit of the filter time-scale will generally be much less than the length of the image sequence however as there will not normally be any emitter fluctuations of such a long time-scale.

The filters are applied to a series of pixel intensity time traces constructed from the input image sequence. An intensity time trace is produced by collating (concatenating)

values for a particular x,y pixel in every image frame in the sequence in order. A filter with a particular characteristic time-scale is applied to a specific point in the pixel intensity time trace and the output value recorded. The filter is then applied to multiple points in the time trace (usually but not necessarily every point) and each resultant value appended to the previous ones to produce an output pixel intensity time trace. The process is repeated for each pixel intensity trace in the original image sequence, generating an equal number of output pixel intensity time traces. These output intensity traces are reconstituted in their original x,y pixel positions to create an output image sequence. The process is then repeated for the next and all subsequent filters in the set, with each output image sequence appended to the previous one, producing a total output sequence much longer than the original.

The order in which a filter is applied to the different points in the pixel intensity time traces is not important, unless the time evolution of the structure is to be observed, so long as it is maintained for all such traces. Neither is the order in which each filter is applied. Alternatively each filter can be sequentially applied to a single input intensity time trace with the outputs appended to a much longer output time trace. So long as the order of applying filters is consistent throughout, these longer output traces are then combined to the final output image sequence as before.

When an emitter's intensity fluctuates or it switches emitting state the time traces of all the pixels within a PSF width of its position will show an intensity change (fluctuation) at that point in time. If no other emitters whose PSF overlaps with the first switch intensity within the same image frame, then the relative magnitude of these fluctuations between adjacent pixels will reflect the PSF of the instrument. However if two or more nearby emitters switch intensity within the same image frame then some pixels within the range of an emitter's PSF will display an intensity change in the time traces resulting from multiple emitters while other pixels just from the single emitter alone. It is extremely unlikely however that for any of the other emitters overlapping with a single emitter's PSF that both the previous and subsequent intensity switches also occurred in the same image frame as each other and by the same relative amount. The contributions of each emitter to an individual pixel intensity fluctuation from frame to frame can therefore be separated on the basis of how many image frames they lasted. This is what is achieved by the multiple time scale temporal filtering. By comparing pixel intensity values over a number of frames, the output of each filter is an image sequence containing only a subset of intensity fluctuations, the time scale of which is governed by the characteristic time scale of the applied filter. Again where an individual emitter switches intensity all the filtered pixel traces within its PSF will show a coincident output with values representative of the shape of the PSF, but this time only for emitters that switched on a time scale set by the characteristic time scale of the applied filter. Where signal noise from an emitter of a different time scale passes through the filter it will not share the same spatial coincidence and adjacent pixel intensities will not reproduce the instrument PSF. The localisation algorithm is designed to identify intensity distributions following the instrument PSF and locate their position whilst rejecting noise.

Put another way, the output of a short time scale filter is an image sequence which contains fluorescence 'spots' only for emitters/flurophores that were in the emitting state for a specific small number of image frames. Whilst the output of a long time scale filter only contains emitters/flurophores that were emitting for a large number of frames. The number of emitters (and therefore the emitter density and PSF overlap) in each frame is greatly reduced, enabling the localisation algorithm to more accurately find their positions. By combining the results from multiple filter time scales almost all emitters/flurophores appear in at least one image frame. This enables a sufficient number of localisations to produce a high resolution reconstruction without the presence of significant image artefacts.

A further use of the multi time scale temporal filtering is as an alternative/supplement to multi colour imaging. The output of the shorter and longer time scale filters can be combined to for a 'high-pass' and 'low-pass' pair (or bandpass if divide into more than two groups). If the sample is labelled with one 'fast/good' blinking flurophore and one 'slow/poor' blinking fluorophore, each filter pair would contain emission principally from only one or other of the two flurophores even if they have the same emission wavelengths. Thus avoiding the disadvantages of multi colour imaging described above.

Further features and advantages will be apparent from the following detailed description.

DETAILED DESCRIPTION OF THE EMBODIMENTS

An example embodiment of the invention will now be described with reference to the Figures. In particular, FIG. 2 illustrates an example microscope apparatus that may be used to capture images which are then processed in accordance with the techniques set out herein to enable high resolution localisation of emitters/fluorophores in an imaged sample.

Figure 2:
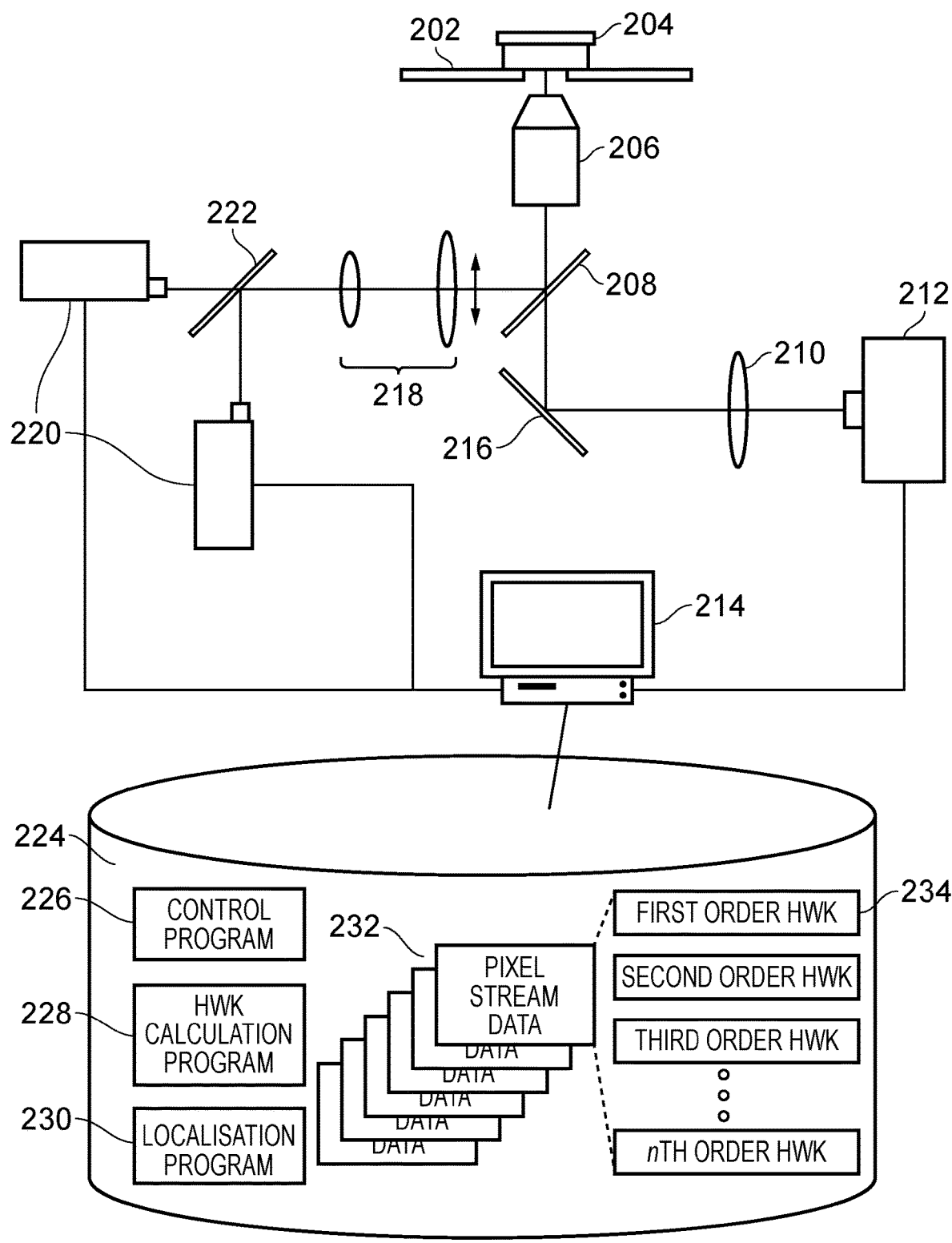
FIG. 2 is a diagram of a localisation microscopy apparatus according to an embodiment of the invention.

In more detail, an example of an apparatus typically employed in the acquisition of a localisation microscopy image sequence in accordance with an embodiment of the invention is shown in FIG. 2. The fluorescently labelled sample of interest (204) is held in a fixed/adjustable relative position to a high numerical aperture objective lens (206) by a sample stage (202). An excitation light source or sources (220) which will commonly consist of an excitation wavelength/wavelengths and an activation wavelength which are directed along a common light path by a beam combining optic (222). The light sources may be lasers or some other high intensity collimated light source. Further beam conditioning optics, such as a beam expanding telescope (218) may be used to alter the beam intensity profile and collimation. The light sources are then reflected through the objective lens (206) by a dichroic mirror (major dichroic 208) onto the sample (204). The coupling and directing of the light sources up to the point of the major dichroic (208) may also be achieved partly or completely by optical fibres. The beam directing/conditioning optics will usually feature some means to displace the beam path through the objective so as to achieve total (or close to) internal reflection (TIRF) of the excitation light at the sample interface.

The fluorescence light from individual emitters/fluorophores is collected by the objective lens, passed through the major dichroic, and directed by optics (216) through the tube lens (210). This brings the light to focus on the sensor of a digital camera (212) forming an image. The camera must be sensitive enough to detect the low light levels involved but also fast enough to capture many images per second (ca.100). Typically therefore either scientific CMOS (sCMOS) or electron multiplying CCD (EMCCD) cameras are used. The output data stream is recorded on a computer (214).

The computer (214) is provided with a data storage medium 224 such as a hard disk, flash drive, memory card, or the like upon which can be stored data to be processed in the form of pixel data from the images captured by the microscope apparatus, the output of that processing in the form of processed imagery, and executable programs that when executed control the computer to perform the necessary processing of the input images to obtain the output images, being in this case a general control program (226), a Harr Wavelet Kernel (HWK) calculation program (228), and a localisation program (230). The general control program (226) has overall control of the process, and calls into operation the HWK calculation program and the localisation program as required. The HWK calculation program (228) takes input streams of pixel data relating to respective individual pixels in the captured microscopy images, and applies Harr Wavelet functions to them in the manner to be described below in order to generate, for each pixel, an output stream of pixel data where the respective Harr Wavelet function filtered pixel data is output, with the respective outputs obtained from the respective application of different orders of Harr Wavelet function (e.g. 1st to 4th order, for example) being concatenated or otherwise combined together to form the output pixel stream, on a per pixel basis. The output pixel stream will contain both positive and negative values corresponding to increasing or decreasing intensity in the input pixel stream. These can be dealt with by taking their absolute values or by doubling the size of the output pixel stream and separating positive and negative values into two sequential output pixel streams and subsequently tacking absolute values. In such a case all missing values are padded with zeros. A third option is a large fixed offset value is added to all output pixel values such that there are no negative pixel values in the output image sequence (e.g. half the dynamic range of the input) The output images sequence then consists of both maxima and minima corresponding to emitters. In this situation the localisation algorithm must be able to fit negative as well as positive amplitude model PSFs which is likely to produce more accurate localisations. Thus, the output pixel streams contain more data than the input streams, as an output pixel value (or two pixel values if positive and negative values are separated) is generated for each order of Harr wavelet function that is applied to a particular input pixel.

For example, if first to fourth order HWK functions are applied to an input pixel stream, then the output pixel stream will have four (or eight, if positive and negative values are separated) pixel values (one/two generated by each of the first to fourth order HWK functions) for each input pixel value. These four (or eight) values are typically then concatenated one after the other in the output pixel stream, and the output pixel stream per pixel is then used by the localisation program 230 as the input thereinto in order for it to be able to localise emitters based on the HWK filtered pixels. In this respect, the localisation program 230 can be of conventional operation, apart from the fact that it takes as its input the per pixel output streams 234 from the HWK calculation program 228, and performs emitter/fluorophore localisation on those streams, rather than the raw pixel streams 232 from the microscope. Of course, in other embodiments other temporal filter functions other than the Harr-Wavelet function may be applied, for example Butterworth or Chebyshev filters. The mention of HWK filters herein is therefore purely for example only, and more generally other temporal filter functions that are able to discriminate between events lasting different lengths of time may be used.

FIG. 1 is a flow diagram that illustrates in more detail the processing performed in an embodiment of the invention (although further graphical examples will be given later). Here, the general schema is that each temporal filter is applied sequentially to each point in a pixel intensity time trace in turn before moving to the next pixel trace. Each output time trace is then recombined into an image sequence before repeating the procedure with the next filter and appending the results to the previous ones. It is equally valid however to apply each filter in turn to a single point in the pixel time trace, appending each result to the output time trace before moving to the next position in the input time trace. Or it is also possible to combine the results of a filter on the same time point on every pixel intensity trace, forming the results into an image which is appended to the output sequence before moving to the next point in the time traces. The order in which these integrations are performed is not critical so long as consistency is maintained throughout the entire image sequence, or if consistency is not maintained, that the order of the integrations in the output file is known.

In view of the above, FIG. 1 shows one example processing flow diagram that may be performed in an embodiment of the invention, which operates on a per filter, per pixel position basis i.e. for an input image sequence a first temporal filter e.g. nth order HWK filter is applied to each stream of pixels on a per pixel basis until all the pixels positions have been processed with the filter, and then the process is repeated, but applying the the n+1th order filter, again until all the pixel positions have been processed for the entire video sequence. This then repeats for each order filter in turn, until all of the filters have been applied, in which case the output image sequence (which is now much longer than the input sequence and specifically x (or 2x) times the length, where x is the number of different order filters that are applied) is then output to the localisation algorithm for emitter detection.

In more detail with reference to FIG. 1, at s.1.2 a microscopy image sequence is received at s.1.2, and then a selection of the processing temporal filters to be applied (e.g. HWK, Butterworth, Chebyshev, etc) and the order of the filter to be first applied is made, at s.1.4. Then, at s.1.6, a first pixel position in the received image frames is selected e.g. pixel position (a,b) in the frames. A pixel time trace or stream is then constructed by looking at the pixel values for the selected pixel position in each frame of the input microscopy frame sequence. That is, for example, a stream of pixel data is obtained for pixel position (a,b) in the frame by concatenating all the pixel values of position (a,b) from each frame in the sequence together into a single sequence.

At s.1.10 a start point in the pixel time trace/stream is selected, and at s.1.12 the selected filter is applied to the pixel values at and around the selected start point. The result of the filter (further details of the filter calculation are given later) are then obtained, and an output time trace for the particular pixel position (a,b) is then initiated, containing the result, at s.1.22. At s.1.24 an evaluation is made as to whether all the pixels (a,b) in the sequence of frames have had the filter applied to them, and if not the next pixel in the sequence is selected at s.1.26, and processing returns to s.1.10. By iterating this processing loop the temporal filter is applied to every pixel in the pixel time trace/stream for the pixel position (a,b).

Some of the filter results may have resulted in negative values, which need to be removed. A clean-up routine is then run on the pixel time trace dependent on the options described above to deal with negative values in the manners described in more detail later, and then the output trace for the pixel position (a,b) in output as the pixel trace for position (a,b) in the output sequence. the next pixel position in the frame (e.g. (a+1, b)) can then be processed in the same manner, and processing returns to s.1.6. By iterating the above steps for each pixel position in the microscopy frames, then a pixel trace for the presently selected temporal filter is obtained for each pixel position (s.1.34).

The processing then decides whether all of the desired temporal filters have been applied. In this respect, typically higher order filters will also be applied, e.g. first to fourth order Harr-Wavelet filters, or Butterworth filters. If all of the filters have not been applied then at s.1.40 the next filter is selected (e.g. if the first order HWK filter was just applied, the second order would be next selected etc), and processing proceeds back to the top of the loop at s.1.4. In this way, each corresponding pixel at the same position (a,b) in each frame is processed using a first temporal filter, then each corresponding pixel at the same position (a,b) is processed using a second temporal filter (e.g. a higher order filter), and so on, until all of the filters have been applied to each pixel trace. Once all of the filters have been applied, the collections of filter-processed pixel traces are then collected together, for example by being concatenated in a known order, and can then be used as input to the localisation algorithm.

Figure 3:
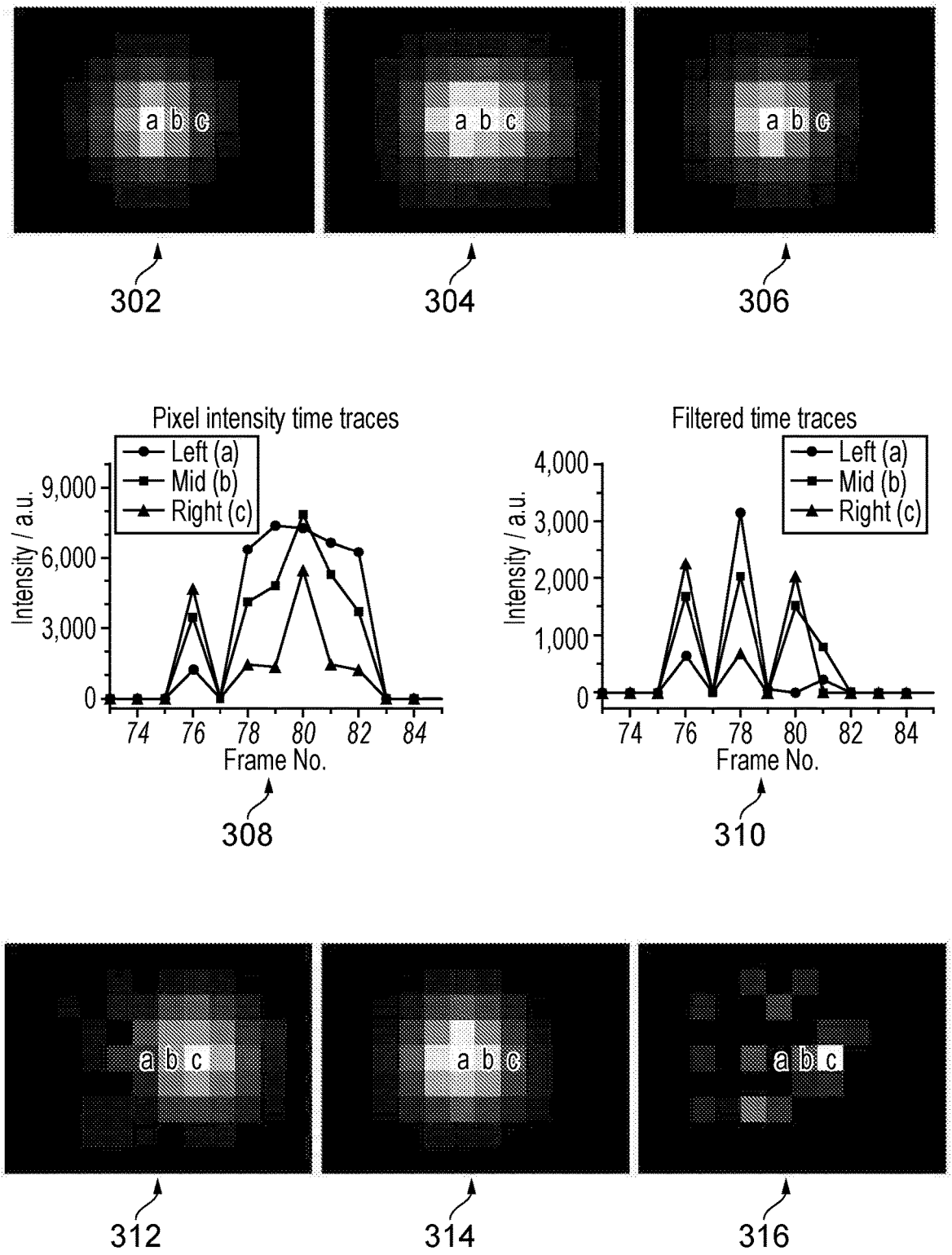
FIG. 3 is a diagram of frame sequence before and after processing according to an embodiment showing reduced emitter density.

A demonstration how the filtering of pixel intensity time traces separates the fluorescence contributions of individual emitters is shown in FIG. 3. The top 3 images (302,304,306) show 3 consecutive frames from a simulation of 2 closely spaced (i.e. separated by less than the PSF) flurophores randomly switching between emitting and non-emitting states. One flurophore is located in the centre of the pixel marked 'a' the other in the centre of pixel 'c'. In the central frame (304) both flurophores are in the emitting state and in that case their individual PSFs (fluorescence spots) overlap substantially. In the previous and subsequent frame (302 and 306 respectively) only the flurophore at 'a' is emitting. The switching of the two emitters can be seen in the corresponding pixel intensity times traces (308), show here for the three pixels marked 'a', 'b', 'c' in the images (302,304,306) which correspond to frames 79,80 and 81 of the sequence. At frame 76 only the flurophore at pixel 'c' is emitting which is reflected in the intensity of pixel 'c' being higher than that of pixel 'b' which in turn is higher than pixel 'a'. The reverse ratio is true when only the fluorophore at 'a' is emitting as in frames 78, 79, 81 and 82. At frame 80 a fluctuation in the pixel intensity time traces is observed. The relative magnitudes of this fluctuation between the three pixels at frame 80 is very similar to that observed in frame 76 when only the flurophore at 'c' was emitting. This fluctuation can be separated from the rest of the time trace by the application of the filters.

The results from using the first Haar wavelet (described in FIG. 4 and below) as the filter function for these three pixels (310) show only the fluctuations that lasted a single frame. The intensity ratios for the three pixels are reversed when the flurophore at 'c' switches to the emitting state (frames 76 and 80) compared to when the flurophore at 'a' switches on (frame 78) and near zero elsewhere, even though both are emitting together in frame 80. When all the filtered pixel intensity time traces are recombined into an image sequence, the filtered image corresponding to frame 80 (312) shows a PSF sized fluorescence spot centred on pixel 'c'. Application of the third Haar wavelet as the filter isolates the longer time fluctuation caused by the flurophore at 'a' switching to the emitting state for frames 78-82. The image from the filtered sequence corresponding to frame 80 in this case (314) shows a PSF sized fluorescence 'spot' centred on pixel 'a'. The fluorescence contributions from the two emitters in frame 80 (304) have been separated from each other into 2 separate image frames (312 and 314). A standard low density localisation algorithm should now be able to individually localise the two emitter/flurophore positions to high accuracy whereas before it is highly likely it would be unable to identify that there were two emitters present, and therefore falsely localise to the central position between the two flurophores, causing artefacts in the reconstruction. The output from the first Haar wavelet filter contains noise from emitter fluctuations that last longer than a single frame. An example output frame from this filtered sequence (316) when the flurophore at 'a' was emitting for its 5 frame period (frames 78-82) shows the relative amplitude of this noise is not an accurate reflection of the PSF. Some localisation algorithms may however sometimes attempt to fit this noise as a fluorescence 'spot' leading to reduced image quality in the reconstruction. As the fits to these localisations are of lesser intensity and non-physically wide or narrow, they can easily be removed from the list of localisations used in the reconstruction if necessary. The number of overlapping emitters that can be separated in this way is essentially unlimited, given sufficient signal to noise, so long as they all result from different time scale fluctuations.

Figure 4:
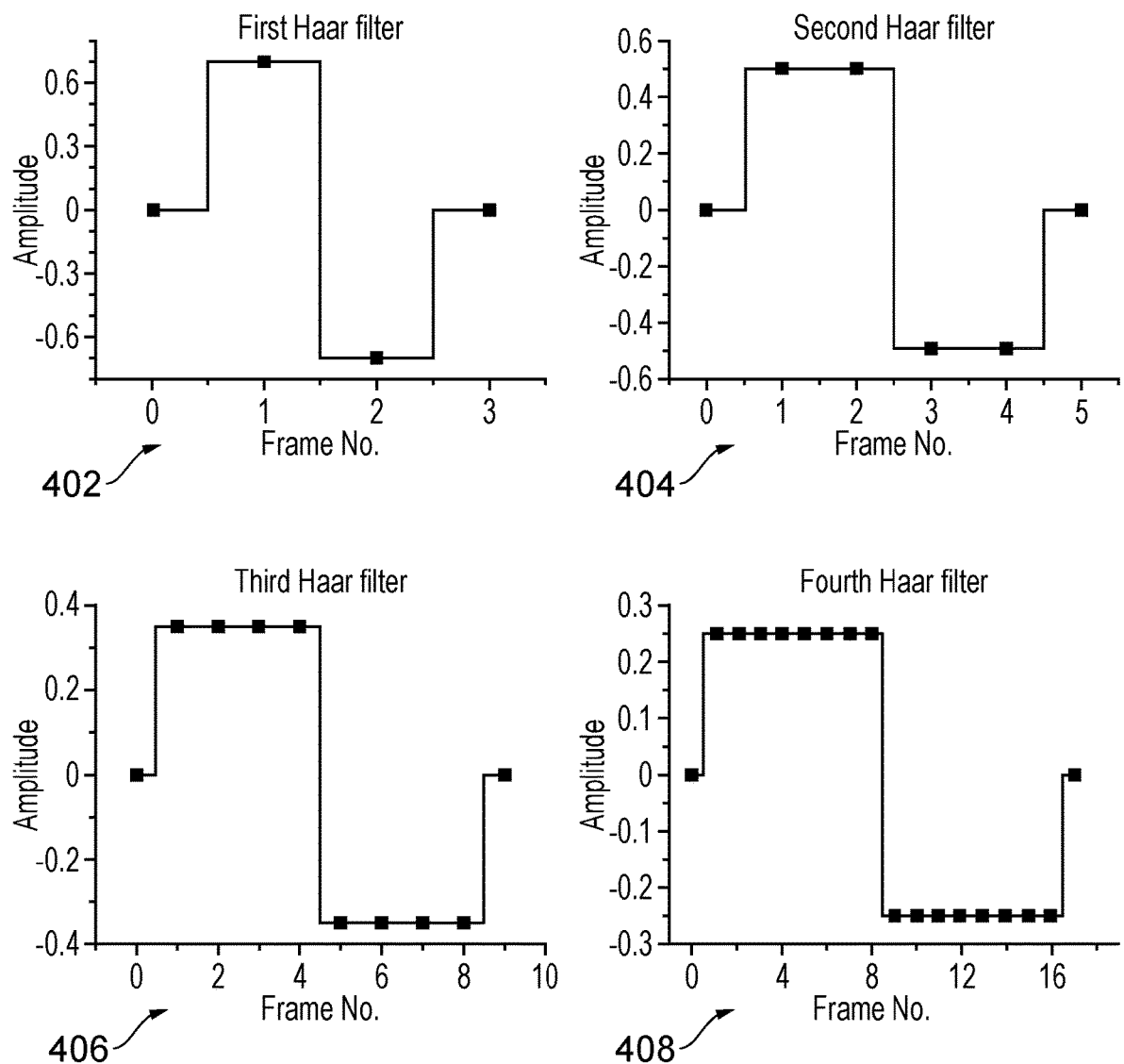
FIG. 4 is a diagram of example filter set using Haar wavelets.
Figure 4:
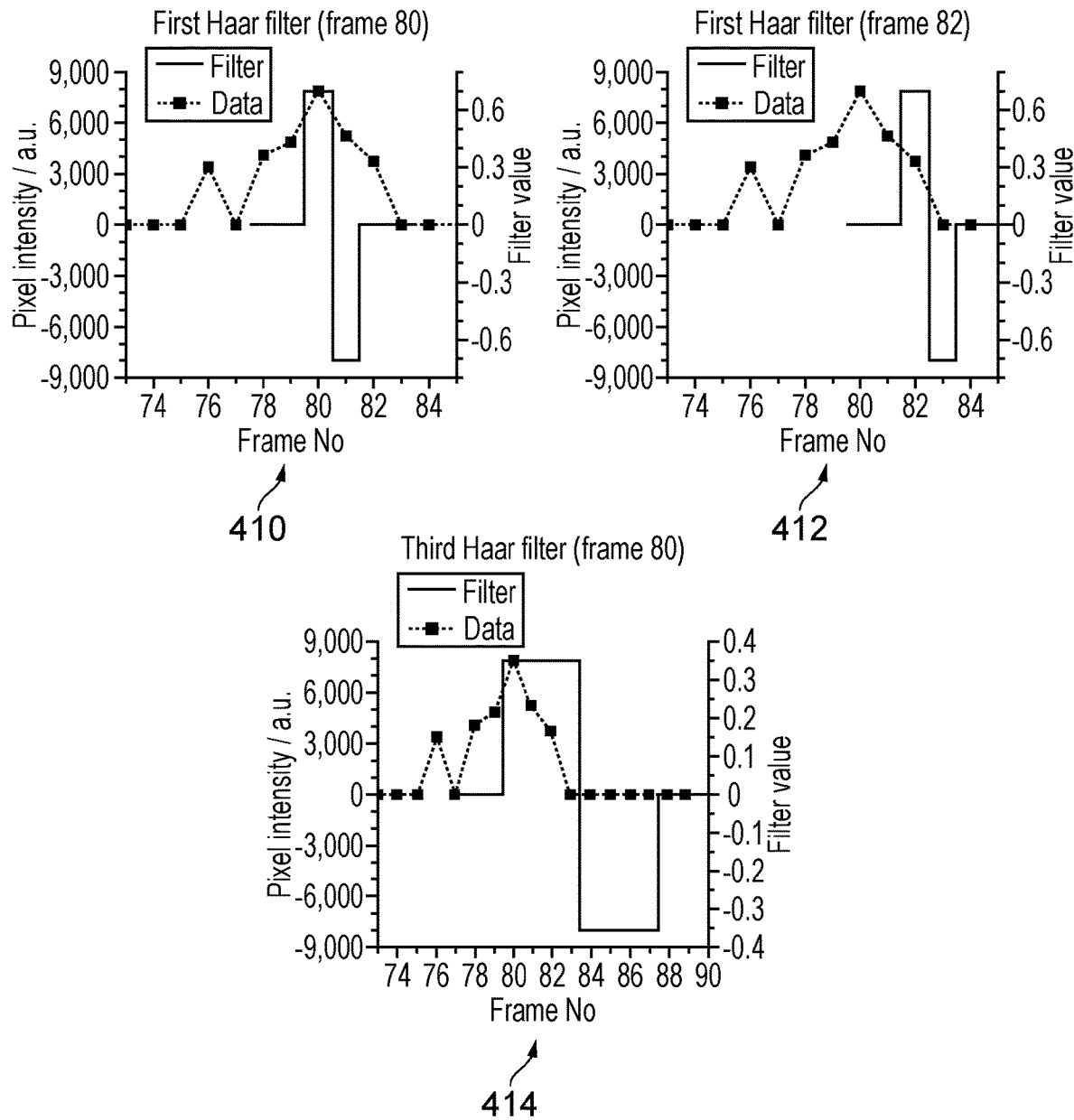

The filter set can be any set that compares pixel intensity values over a range of adjacent or nearby frames. Each filter has a characteristic time scale over which it is sensitive to intensity fluctuations. The examples described from this point on use the Haar wavelet functions as the filter set. FIG. 4 depicts the first 4 wavelets (402, 404, 406,408 respectively). These functions have been used extensively in image analysis in the context of data compression. When applied to an intensity time trace in the manner described here they indicate the differences in mean intensity values before and after a time point in the trace over a varying time scale. The application of the first Haar wavelet filter to the pixel time trace marked (b) in FIG. 3 is shown for starting frame 80 (410) and frame 82 (412) along with the third Haar filter (414) also at frame 80.

The precise implementation of the algorithm is shown here with two examples. Both use the Haar wavelet functions described above as the filter set. The first demonstrates applying the filters to the pixel intensity time traces by way of matrix multiplication which highlights the individual steps involved. The second is a more concise embodiment of the method that applies the filters by convolving the time traces with a kernel.

Matrix Multiplication Example

The first step is to construct a set of pixel intensity traces from the unprocessed image sequence;

$$X(t) = \{I_{xy}(n=1), I_{xy}(n=2), \ldots I_{xy}(n=N-1), I_{xy}(n=N)\} \quad (1)$$

where x,y are the pixel indices and t is the frame number. For each pixel in turn its intensity trace X(t) (as a column vector) is multiplied by the Haar matrix to produce its transform trace Y(t').

$$Y(t') = H*X(t) \quad (2)$$

The non-zero elements of the Haar matrix are given by;

$$h_{i=1,j} = \left(\frac{1}{\sqrt{2}}\right)^{\log_2 N}, h_{i>1,j} = \frac{1}{2^{(m/2)}} *(-1)^k, \quad (3)$$

-continued $$k = \text{floor}\left(\frac{j-1}{2^{(m-1)}}\right)\frac{N}{2^m} + 1 \leq i \leq \frac{N}{2^{(m-1)}},$$

$$2^m(i-1) + 1 \leq j + N \leq 2^m i, \, m \leq \log_2 N \quad (5)$$

where i,j are the row and column indices, floor( . . . ) indicates rounding down to the nearest integer and N is the total number of frames which must be truncated to an integer power of 2. The positive integer m represents the 'level' of the Haar Wavelet Transform (HWT). Each level corresponds to a differing length of fluorophore blinking in the original time trace, from the shortest (m=1) to the longest (m=log$_2$ N) and a DC component. This corresponds to intensity fluctuations (blinks) lasting from a single frame up to half the length of the image, plus a constant background (sample plus camera). The appropriate values of m will be discussed later. An example HWT for a simple 4 frame intensity trace is given below.

$$\begin{pmatrix} 2 \\ 0 \\ -\sqrt{2} \\ 0 \end{pmatrix} = \begin{pmatrix} 1/2 & 1/2 & 1/2 & 1/2 \\ 1/2 & 1/2 & -1/2 & -1/2 \\ 1/\sqrt{2} & -1/\sqrt{2} & 0 & 0 \\ 0 & 0 & 1/\sqrt{2} & -1/\sqrt{2} \end{pmatrix} \begin{pmatrix} 0 \\ 2 \\ 1 \\ 1 \end{pmatrix} \quad (4)$$

Here the different filter levels of the Haar matrix are m=1 (lower two rows), m=2 (second row) and a background (top row).

The next stage is to apply the filter (level m) to the transformed intensity trace. This is done by setting all the elements of the column vector that don't correspond to that specific level of the Haar matrix to zero.

$$Y^{(m)} = \begin{Bmatrix} \vdots \\ 0 \\ y_{a+1} \\ \vdots \\ y_{2a} \\ 0 \\ \vdots \end{Bmatrix}, \, a = N/(2^m), \, m \leq \log_2 N \quad (5)$$

To obtain the filtered pixel intensity trace the inverse HWT must be applied. The inverse of the Haar matrix is easily found as it is equal to its transpose.

$$H^{-1}H^T \quad (6)$$

The filtered pixel intensity trace $Z^{(m)}$ is then given by:

$$Z^{(m)}(t)H^T*Y^{(m)}(t') \quad (7)$$

Below is the inverse transform of the example above after filter level m=1 has been applied to the transformed intensity trace in equation (4).

$$\begin{pmatrix} -1 \\ 1 \\ 0 \\ 0 \end{pmatrix} = \begin{pmatrix} 1/2 & 1/2 & 1/\sqrt{2} & 0 \\ 1/2 & 1/2 & -1/\sqrt{2} & 0 \\ 1/2 & -1/2 & 0 & 1/\sqrt{2} \\ 1/2 & -1/2 & 0 & -1/\sqrt{2} \end{pmatrix} \begin{pmatrix} 0 \\ 0 \\ -\sqrt{2} \\ 0 \end{pmatrix} \quad (8)$$

Note that the filtered intensity trace contains odd-even frame pairs of equal magnitude but opposite sign. This is an inevitable consequence of using a single Haar frequency component, however the spatial correlation of the signs is physically meaningful. A cluster of positive values which is the same size of the PSF indicates an emitter increasing its brightness from an odd to an even frame. A similar cluster of negative values conversely indicates an emitter reducing in brightness. This provides a mechanism for separating On and Off transitions by cropping all negative values to zero in odd numbered frames, and cropping all positive values to zero and then multiplying by −1 in even frames. This cropping procedure for the filtered intensity traces is described by the following conditional equations:

$$\begin{cases} Z'^{(m)}(t)Z^{(m)}(2t-1)::Z^{(m)}(2t-1) > 0, & Z'^{(m)}(t) = 0::Z^{(M)}(2t-1) \leq 0 & \ldots & t \leq N/2 \\ Z'^{(m)}(t) = -Z^{(m)}(2t)::Z^{(m)}(2t) < 0, & Z'^{(m)}(t) = 0::Z^{(m)}(2t) \geq 0 & \ldots & t > N/2 \end{cases} \quad (9)$$

where $Z'^{(m)}(t)$ is the cropped pixel intensity trace.

The transform-filter-inverse transform process is repeated for every pixel in the image sequence producing a set of filtered intensity traces $Z_{xy}^{(m)}$ from the set of unfiltered traces $X_{xy}$. These are then recombined to form a filtered image sequence $I_n^{(m)}$.

$$I_n^{(m)} = \Sigma_{xy} Z_{xy}'^{(m)}(t=n) \quad (10)$$

For the first level of filtering m=1 the HWT only compares intensity values with one of its two neighbouring frames. This can be easily rectified by repeating the process with all the wavelet functions shifted by one frame (rotating the columns of the Haar matrix). Equally valid is to cyclically rotate the image sequence one frame. This will then compare even with odd frames (2 with 3, 4 with 5 . . . ). The new pixel intensity traces are given by;

$$\begin{cases} X'(t) = X(t+1) \cdots t < N \\ X'(N) = X(1) \cdots t = N \end{cases} \quad (11)$$

The process is then repeated on this new set of pixel intensity traces X'(t). The resulting image sequence is appended to the previous one resulting in twice the number of frames as the original data.

The final output image sequence is obtained by repeating the whole process for each of the desired filter levels m and appending the resulting image sequences together, producing a much longer image sequence than the original. When performing filter levels m>1 the output of equation 7 will produce $2^{(m-1)}$ duplicate frames. Before proceeding to equation 9 therefore all but every $2^{(m-1)}$ th element of $Z^{(m)}$ can be dropped, resulting in a shortened intensity trace and therefore shorter image sequence from equation 11. But as the original image sequence can be permuted $2^{(m-1)}$ times before duplication of the output occurs, each filter level will still output 2N frames in total.

The appropriate number of filter levels to apply will depend on the flurophore blinking properties. Essentially one is trying to choose a range of time scales that covers the majority of emitter 'On' times. The procedure can therefore be continued for the 3rd, 4th or higher levels (corresponding to 4, 8 16 . . . frame comparisons) but past the 5th level the number of emitters that are 'On' long enough becomes small unless the flurophore has poor blinking properties or the buffer conditions are far from optimal. However there is little disadvantage to choosing more filter levels other than the increase in image sequence size and associated analysis time. In practice where the original total number of frames N may be $10^4$ or more calculation of the HWT can be computationally intensive. The image sequence is can therefore divided into smaller sections (eg 256 frames). Each section is processed separately and the results appended to a single image sequence. This also prevents discarding too many frames if N is not a power of 2.

Once the desired number of filter levels has been applied, the output image sequence can be analysed in the normal way using any single or multi emitter fitting algorithm, or a non-linear image processing technique such as SOFI or SRRF. The only difference when performing fitting is that since the background has been removed the camera base level should be set to zero. Additionally filtering, particularly the first (m=1) filter level, increases the relative contribution of noise (shot, readout etc.) to the pixel intensity traces. This may produce relatively high intensity single pixels in the processed images (see 316), particularly if the emitter brightness in the original sequence is low. A localisation algorithm may try to fit these as emitter PSFs which are either very narrow (for single instances) or very broad (for diffuse clusters). If the algorithm supports it, improvements in reconstruction image quality can be obtained by omitting localisations with non-physically broad or narrow PSFs to a greater degree than with unprocessed data, whilst still leaving a greater number of localisations than in unprocessed data. (Note: As an alternative, it would also be possible to introduce a filter at the output stage of the algorithm to remove these locally bright pixels.) This is possible because the false-noise induced localisations are generally of lower intensity than 'real' emitter signals (unless the signal to noise is very low). Filtering out low intensity localisations is also effective (to a lesser degree) and is compatible with the astigmatic lens method of 3D localisation microscopy.

Kernel Convolution Example

The Haar filters can equally be expressed as a one dimensional image kernel. The first three Haar kernels are of size 2, 4 and 8 respectively and are given by:

$$H_0=[1,-1] \tag{12}$$

$$H_1=[1,1,-1,-1] \tag{13}$$

$$H_2=[1,1,1,1,-1,-1,-1,-1] \tag{14}$$

As before, we treat each pixel independently as an intensity time sequence. So, given an image stack $(I(x, y, t))$, for a given pixel location x, y the time sequence is $X(t)=I(x, y, t)$. We then compute convolutions of X with the kernels:

$$Z_0 = X * H_0$$

$$Z_1 = X * H_1 \tag{15}$$

etc, where * is the discrete convolution operator. We do not pad X, therefore the resulting Z are shorter than X. We create the final time sequence for the pixel x, y by concatenating the various Z's:

$$Z=[Z_0(0), \ldots ,Z_0(n_0), Z_1(0), \ldots ,Z_1(n_1), \ldots ] \tag{16}$$

where $n_i$ is the number of elements in $Z_i$. A fluorophore switching off will cause negative values in Z. The final step is to separate the positive and negative values into Z':

$$Z'(i)=\max(Z(i),0) \text{ for } i=1,2, \ldots ,n$$

$$Z'(i+n)=-\min(Z(i),0) \text{ for } i=1,2, \ldots ,n. \tag{17}$$

As an alternative it is also possible to use the absolute value:

$$Z'(i)=|Z(i)|. \tag{18}$$

We reassemble each of the final time sequences Z' into an image stack, then analyse each frame independently with a third party algorithm, such as ThunderSTORM.

This embodiment of the algorithm is very quick to compute, taking much less time than the subsequent localisation analysis. When combined with single emitter Gaussian fitting it not only offers improved accuracy but is also one of the quickest high density methods to compute.

(Ref ThunderSTORM) Ovesný, M., Křížek, P., Borkovec, J., Švindrych, Z. and Hagen, G. M. ThunderSTORM: a comprehensive ImageJ plug-in for PALM and STORM data analysis and super-resolution imaging. Bioinformatics 30, 2389-2390 (2014).

Various further modifications, whether by way of addition, deletion, or substitution may be made to above mentioned embodiments to provide further embodiments, any and all of which are intended to be encompassed by the appended claims.

The invention claimed is:

1. A method for localisation microscopy, comprising:
receiving a temporal sequence of microscopy image frames captured by a microscope, the image frames being images containing emitters or fluorophores therein;
temporally filtering respective sets of pixel values for respective same pixel positions in the sequence of frames using a plurality of temporal filters having different filter characteristics in order to obtain respective sets of pluralities of temporally filtered pixel values for the respective same pixel positions in the frames; and
providing the respective sets of temporally filtered pixel values as input to a localisation algorithm to permit emitter or fluorophore localisation in dependence thereon.

2. A method according to claim 1, wherein the temporal filtering comprises:
for a pixel position in the image frames, forming a pixel trace of corresponding pixel values at the same pixel position in the image frames;
applying a first temporal filter to the pixel values in the pixel trace to obtain a first filtered pixel trace; and
applying at least a second temporal filter different to the first temporal filter to the pixel values in the trace to obtain a second filtered pixel trace; and combining the first filtered pixel trace and the second filtered pixel trace into a single filtered output trace for input to the localisation algorithm.

3. A method according to claim 2, and further comprising:
applying at least a third temporal filter different to the first and second temporal filters to the pixel values in the trace to obtain a third filtered pixel trace; and
combining the first filtered pixel trace, the second filtered pixel trace, and the third filtered pixel trace into a single filtered output trace for input to the localisation algorithm.

4. A method according to claim 2, wherein the first, second and third filtered pixel traces are concatenated together to form a combined output trace.

5. A method according to claim 1, wherein the temporal filters are selected from the group comprising:
   i) Harr-Wavelet Kernels;
   ii) Butterworth; or
   iii) Chebyshev.

6. A method according to claim 1, wherein the plurality of temporal filters are temporal filters having different temporal characteristics, wherein the temporal characteristics relate to the number of sequential frames around a present frame to which a pixel for which a filtered value is being presently found that contribute to calculation of the filtered value.

7. A method according to claim 1, and further comprising applying the localisation algorithm to the respective sets of temporally filtered pixel values to identify the positions or emitters or fluorophores in the input images at a higher resolution than would otherwise be possible using the microscope alone.

8. A localisation microscopy system, comprising:
a microscopy system arranged to generate computer readable microscopy image frames;
a processor; and
a computer-readable storage medium storing computer readable instructions that when executed by the processor cause the processor to undertake the following:
   i) receive a temporal sequence of microscopy image frames captured by the microscopy system, the image frames being images containing emitter or fluorophores therein;
   ii) temporally filter respective sets of pixel values for respective same pixel positions in the sequence of frames using a plurality of temporal filters having different filter characteristics in order to obtain respective sets of pluralities of temporally filtered pixel values for the respective same pixel positions in the frames; and
   iii) provide the respective sets of temporally filtered pixel values as input to a localisation algorithm to permit emitter or fluorophore localisation in dependence thereon.

9. A system according to claim 8, wherein the temporal filtering comprises:
for a pixel position in the image frames, forming a pixel trace of corresponding pixel values at the same pixel position in the image frames;
applying a first temporal filter to the pixel values in the pixel trace to obtain a first filtered pixel trace; and
applying at least a second temporal filter different to the first temporal filter to the pixel values in the trace to obtain a second filtered pixel trace; and
combining the first filtered pixel trace and the second filtered pixel trace into a single filtered output trace for input to the localisation algorithm.

10. A system according to claim 9, and further comprising:
applying at least a third temporal filter different to the first and second temporal filters to the pixel values in the trace to obtain a third filtered pixel trace; and
combining the first filtered pixel trace, the second filtered pixel trace, and the third filtered pixel trace into a single filtered output trace for input to the localisation algorithm.

11. A system according to claim 9, wherein the first, second and third filtered pixel traces are concatenated together to form a combined output trace.

12. A system according to claim 8, wherein the temporal filters are selected from the group comprising:
   i) Harr-Wavelet Kernels;
   ii) Butterworth; or
   iii) Chebyshev.

13. A system according to claim 8, wherein the plurality of temporal filters are temporal filters having different temporal characteristics, wherein the temporal characteristics relate to the number of sequential frames around a present frame to which a pixel for which a filtered value is being presently found that contribute to calculation of the filtered value.

14. A system according to claim 8, and further comprising applying the localisation algorithm to the respective sets of temporally filtered pixel values to identify the positions or emitters or fluorophores in the input images at a higher resolution than would otherwise be possible using the microscope alone.

15. One or more non-transitory computer readable media storing computer-readable instructions that when executed by a processor, configure a data processing system to:
receive a temporal sequence of microscopy image frames captured by a microscope, the image frames being images containing emitters or fluorophores therein;
temporally filter respective sets of pixel values for respective same pixel positions in the sequence of frames using a plurality of temporal filters having different filter characteristics in order to obtain respective sets of pluralities of temporally filtered pixel values for the respective same pixel positions in the frames; and
provide the respective sets of temporally filtered pixel values as input to a localisation algorithm to permit emitter or fluorophore localisation in dependence thereon.

16. The non-transitory computer readable media according to claim 15, wherein the temporal filtering comprises:
for a pixel position in the image frames, forming a pixel trace of corresponding pixel values at the same pixel position in the image frames;
applying a first temporal filter to the pixel values in the pixel trace to obtain a first filtered pixel trace; and
applying at least a second temporal filter different to the first temporal filter to the pixel values in the trace to obtain a second filtered pixel trace; and
combining the first filtered pixel trace and the second filtered pixel trace into a single filtered output trace for input to the localisation algorithm.

17. The non-transitory computer readable media according to claim 16, and further storing computer-readable instructions that when executed configure the data processing system to:
apply at least a third temporal filter different to the first and second temporal filters to the pixel values in the trace to obtain a third filtered pixel trace; and combine the first filtered pixel trace, the second filtered pixel trace, and the third filtered pixel trace into a single filtered output trace for input to the localisation algorithm.

18. The non-transitory computer readable media according to claim 16, wherein the first, second and third filtered pixel traces are concatenated together to form a combined output trace.

19. The non-transitory computer readable media according to claim 15, wherein the temporal filters are selected from the group comprising:
  i) Harr-Wavelet Kernels;
  ii) Butterworth; or
  iii) Chebyshev.

20. The non-transitory computer readable media according to claim 15, wherein the plurality of temporal filters are temporal filters having different temporal characteristics, wherein the temporal characteristics relate to the number of sequential frames around a present frame to which a pixel for which a filtered value is being presently found that contribute to calculation of the filtered value.

\* \* \* \* \*